United States Patent
Whaley et al.

(10) Patent No.: US 7,506,810 B2
(45) Date of Patent: Mar. 24, 2009

(54) CARD DETECTION

(75) Inventors: Jeremy Whaley, Bristol (GB); Matthew Hutson, Bristol (GB)

(73) Assignee: STMicroelectronics Limited, Bristol (GB)

( * ) Notice: Subject to any disclaimer, the term of this patent is extended or adjusted under 35 U.S.C. 154(b) by 551 days.

(21) Appl. No.: 11/152,673

(22) Filed: Jun. 14, 2005

(65) Prior Publication Data

US 2005/0284938 A1 Dec. 29, 2005

(30) Foreign Application Priority Data

Jun. 15, 2004 (EP) ................... 04253573

(51) Int. Cl.
*G06K 7/06* (2006.01)
(52) U.S. Cl. ..................... 235/441; 235/492
(58) Field of Classification Search ................ 235/492, 235/441; 327/34
See application file for complete search history.

(56) References Cited

U.S. PATENT DOCUMENTS

| | | | | |
|---|---|---|---|---|
| 4,814,591 A * | 3/1989 | Nara et al. | ................ | 235/380 |
| 5,235,635 A * | 8/1993 | Gulick | ................ | 379/368 |
| 5,912,618 A | 6/1999 | Maugars | ................ | 340/520 |
| 2002/0179707 A1 | 12/2002 | Omet | ................ | 235/451 |
| 2007/0236257 A1* | 10/2007 | Kejriwal | ................ | 327/34 |

FOREIGN PATENT DOCUMENTS

WO    WO9533228 A1 * 12/1995

* cited by examiner

*Primary Examiner*—Daniel A Hess
(74) *Attorney, Agent, or Firm*—Lisa K. Jorgenson; Robert Iannucci; Seed IP Law Group PLLC

(57) ABSTRACT

A card reader reads data stored on a card. A contact signal is produced whose state is indicative of the presence or absence of electrical contact between the card and the card reader. A high state indicates the presence of electrical contact and a low state indicates the absence of electrical contact. Upon insertion of the card into the card reader, vibrations and other mechanical perturbations of the card cause the state of the contact signal to fluctuate rapidly between high and low states. The state of the contact signal is periodically sampled for a predetermined period of time and the number of samples for which the contact signal was high are counted. If the number of high samples exceeds a threshold then stable electrical contact is deemed to have been established between the card and the card reader and a system reset is performed.

37 Claims, 4 Drawing Sheets

CARD DETECTION

BACKGROUND OF THE INVENTION

1. Field of the Invention

This invention relates to systems utilizing cards for storing data, particularly including set-top-boxes for use in pay-television systems.

2. Description of the Related Art

A smartcard is a card with an embedded microchip that can be loaded with data. Smartcards are often used in the field of pay-television where a card may be loaded with data including the viewing rights of the card holder. The card may then be inserted into a set-top-box to allow access to particular services. Smartcards also have extensive use in many other applications.

In many smartcard based systems, the detection of an inserted smartcard is used to trigger particular system processes. For example, for security reasons, insertion of a smartcard into a set-top-box may cause a system reset prior to reading data from the card. Detection of a smartcard is often performed by means of a contact signal that is generated when the smartcard makes electrical contact with a card reader. The state of a contact signal thus allows a smart card to be detected. However, smartcard interfaces are mechanical in nature and this can result in certain problems. For example, at the moment of insertion, the electrical contact between the card and the card reader may be temporarily unstable due to small vibrations and other mechanical perturbations of the card, sometimes referred to as bouncing. This causes noise to occur in the contact signal and rapid fluctuations between high and low signals. During this period, it is difficult to determine when stable electrical contact between the card and card reader has been made.

To overcome this problem, in some prior systems a long period of time is allowed to pass to ensure that card bouncing has ceased before the contact signal is analyzed. In other prior systems, a resistor and capacitor filter arrangement is provided to smooth the contact signal and remove noise over a long time period of time. However, in pay-television systems, it is desirable to perform a system reset in as short a time as possible after inserting a smartcard. If a long time delay is present between inserting a smartcard and performing a system reset, as occurs with the prior methods described above, the system may be vulnerable to hacking prior to the system reset.

One known technique for determining when a sufficiently noise-free contact signal is present is to periodically sample the contact signal. If successive sampled signals have the same value, then the signal is assumed to be stable. One problem associated with this technique is that brief periods of transient stability in the contact signal may result in multiple erroneous system resets.

We have appreciated that it is desirable to provide a means for determining when a stable signal has been established in as short a time as possible. We have also appreciated that it is desirable to eliminate erroneous resets.

BRIEF SUMMARY OF THE INVENTION

An embodiment of the invention comprises a card reader for reading data stored on a card. A contact signal is present whose state is indicative of the presence or absence of electrical contact between the card and the card reader. A high state indicates the presence of electrical contact and a low state indicates the absence of electrical contact. Upon insertion of the card into the card reader, vibrations and other mechanical perturbations of the card cause the state of the contact signal to fluctuate rapidly between high and low states. The state of the contact signal is periodically sampled for a predetermined period of time and the number of samples for which the contact signal was high are counted. If the number of high samples exceeds a threshold then stable electrical contact is deemed to have been established between the card and the card reader and a system reset is performed. In one embodiment, the contact signal is sampled once every millisecond for 64 milliseconds, and a system reset occurs if the number of high samples exceeds 47.

DETAILED DESCRIPTION OF THE INVENTION

The present invention may be utilized in any system in which a card such as a smartcard is used to store data that may be read by the system. For example, the invention may be employed in a pay-television system in which a smartcard used to store a subscriber's viewing rights is read by a set-top-box. The invention may also be employed in any other card reading system.

One system embodying the invention includes a card interface comprising a slot allowing insertion of a card and a card reader for reading data stored on the card. Upon insertion of a card into the slot electrical contacts on the card engage with corresponding contacts in the card reader allowing signals and data to pass from the card to the card reader. Once stable electrical contact has been established between the card and the card reader then data may be read from the card via one or more data access contacts. When a card is inserted into the card interface, the electrical contact between the card and card reader results in the change in state of a signal, referred to herein as the contact signal, which is detected by the card reader. The state of the contact signal is indicative of the presence or absence of electrical contact between the card and the card reader. The contact signal may be a specific signal generated for the purpose of card detection, or an existing signal within the card interface system. For example, in one embodiment, an existing signal which is used to indicate the presence of a card for other purposes may be used as the contact signal.

In one embodiment, the contact signal may be a digital signal having one of two digital level states which may be referred to respectively as a high (or 1) state, and a low (or 0) state. A high state, indicating electrical contact between the card and the card reader, may be produced by a voltage near to the supply voltage of the system. A low state, indicating no electrical contact between the card and the card reader, may be provided by a voltage near to zero. A high state shows the presence of a card while a low state shows the absence of a card. Thus, insertion of a card into the card reader causes a change in state of the contact signal from a low state to a high state. In an alternative embodiment, the polarity of the contact signal sense may be reversed by an XOR gate so that a low state may be indicative of the presence of a card while a high state may be indicative of the absence of a card.

Figure 1:
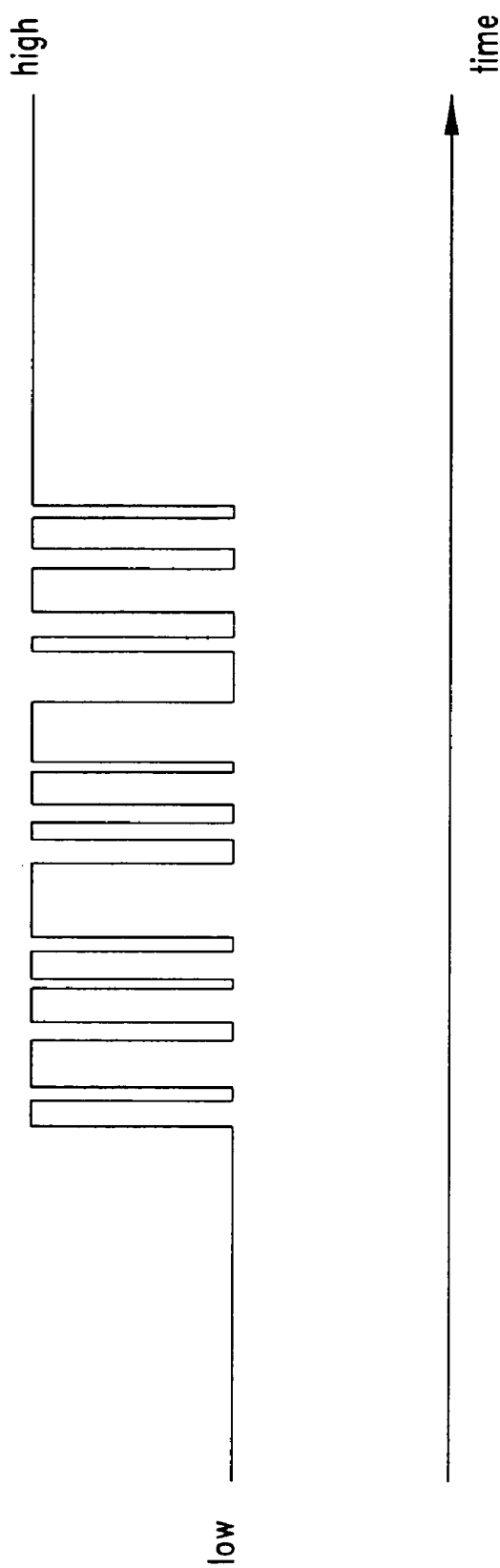
FIG. 1 shows the state of a contact signal upon insertion of a card into a card detection system embodying the invention.

FIG. 1 shows the change in the contact signal as a function of time during insertion of a card into the card interface. Initially, no card is present and so a stable low contact signal is produced, illustrated by a constant low contact signal on the left hand side of the figure. After a particular period of time, when stable electrical contact is established between the card and the card reader, a stable high contact signal is present, illustrated by a constant high contact signal at the right hand side of the figure. At intermediate times, small vibrations and other mechanical perturbations of the card results in unstable contact between the card and the card reader. This instability causes periods of rapid fluctuation between a low and high contact signal states. During this period, it is difficult to determine when stable electrical contact between the card and card reader has been made.

Figure 2:
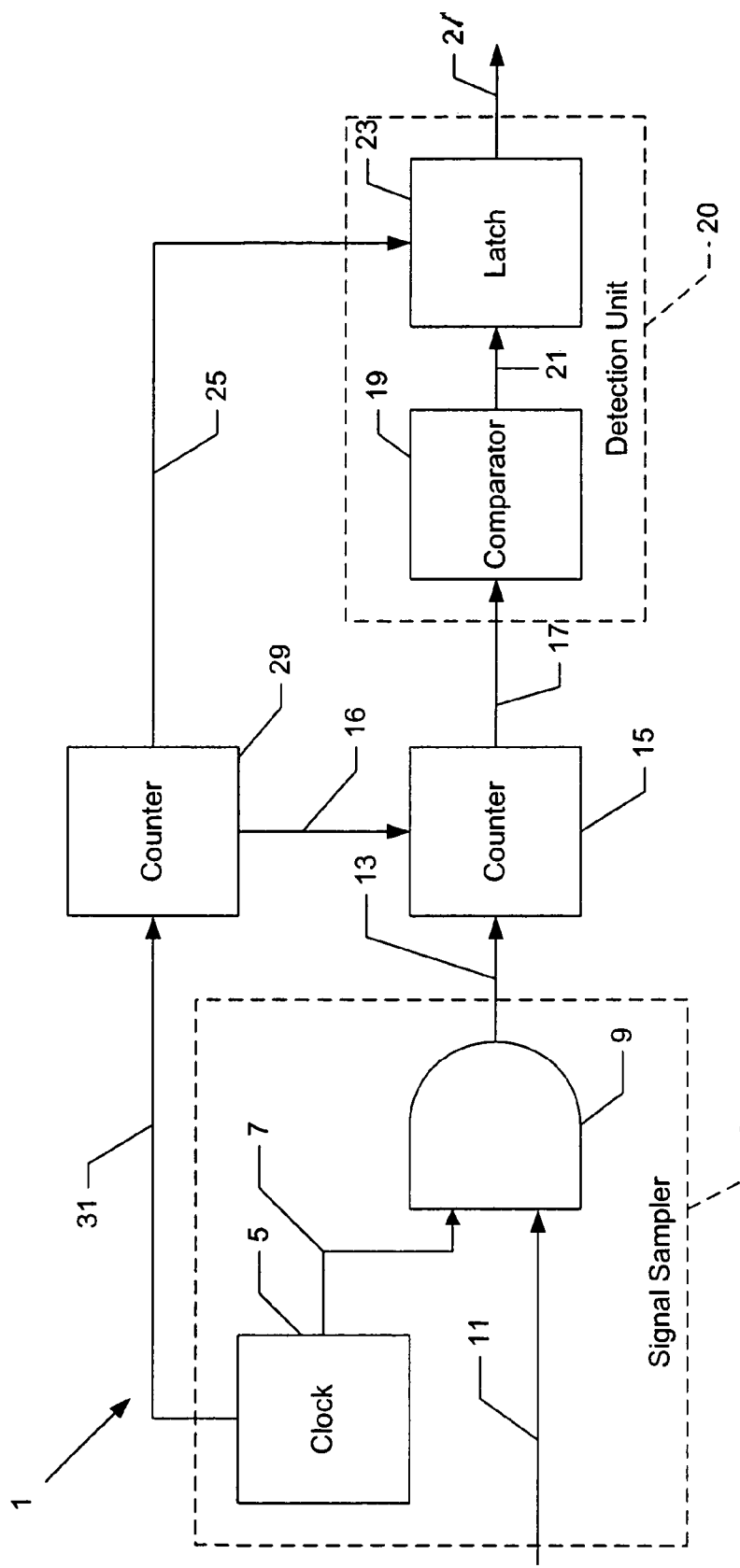
FIG. 2 is a schematic diagram of a first part of a card detection system embodying the invention.

FIG. 2 is a schematic diagram of a circuit 1 for determining when a contact signal has attained a particular stable state indicating that a card is interfaced with the card reader. The circuit may be part of a semiconductor integrated circuit that is located, for example, between the card and a micro-controller of a set-top-box, or within the card itself. The circuit 1 includes a signal sampler 3 having a clock 5 arranged to generate a periodic clock signal. In the preferred embodiment for example, the clock 5 generates a signal in the form of a one bit digital high pulse every millisecond. The clock signal is transmitted via pathway 7 to a first input of an AND gate 9 of the signal sampler 3. A second input of AND gate 9 receives the contact signal via pathway 11. A state signal is transmitted from the output of AND gate 9. The state signal is asserted whenever the presence of a high contact signal coincides with the receipt of a clock signal. For example, a signal such as the state signal may be asserted by having a particular state such as digital high state. In the preferred embodiment a one bit digital high pulse is transmitted from the output of AND gate 9 whenever the presence of a high contact signal coincides with the receipt of a clock signal. In this way, the state of the contact signal is periodically sampled. For example, in the preferred embodiment, since clock signals are generated every millisecond, the state of the contact signal is sampled every millisecond. Only when the contact signal is sampled as high will a state signal transmitted from AND gate 9 be asserted.

The state signal output from AND gate 9 is transmitted via pathway 13 to a counter 15. The counter 15 has an initial value of zero and is arranged to increment by one each time the state signal on pathway 13 is asserted. The value of the counter 15 is caused to be periodically reset to zero by periodic reset signals received by the counter 15 from a pathway 16. In the preferred embodiment for example, the counter 15 is reset to zero every 64 milliseconds. In this embodiment, the counter 15 is a six bit binary counter providing for $2^6=64$ count values. The time period between successive resets of the counter 15 may be referred to as the sampling period. The counter 15 thus stores a value that is representative of the number of samples in which the contact signal was sampled as high in the current sampling period.

The value of counter 15 is transmitted via a pathway 17 to a comparator 19 of a detection unit 20. The comparator is arranged to output a comparison signal if the value received from the counter 15 is greater than a predetermined threshold. For example, in the preferred embodiment, the comparator is arranged to output a signal in the form of a one bit pulse only if the value received from the counter 15 is greater than 47.

The comparison signal output from the comparator 19 is transmitted via pathway 21 to a latch 23 of the detection unit 20. The latch 23 also receives periodic latch signals from a pathway 25, each one being received by the latch shortly before the counter 15 is reset. The latch 23 is arranged to output a card detection signal on a pathway 27 upon receipt of a latch signal only if a comparison signal has been received by the latch 23 since the last latch signal. Thus, a card detection signal is output at the end of a sampling period only if the number of samples in which the contact signal was sampled as high taken within the sampling period exceeded a predetermined threshold. The threshold may be considered an absolute value, or as a percentage of the total number of samples within the sampling period. For example, in the preferred embodiment, a card detection signal in the form of a one bit pulse is output if the contact signal was sampled as high in at least 48 of the samples in the sampling period.

The clock signal generated by clock 5 is transmitted to a second counter 29 via pathway 31. In the preferred embodiment, counter 29 is a six bit binary cyclic counter providing for 64 count values. The counter 29 is initially set to its minimum value and is arranged to increment by one upon receipt of a clock signal on pathway 31. When counter 29 has reached the maximum value, receipt of a clock signal causes the counter to be reset to the minimum value once again. The counter 29 is further arranged to output a first signal on pathway 25 when the counter reaches its maximum value, and to output a second signal on pathway 16 when the counter is reset to the minimum value. By this process, two signals separated by a millisecond are periodically transmitted from the counter 29 every 64 milliseconds. The first signal is the latch signal received by the latch and the second signal is the reset signal that causes counter 15 to be reset.

It can be seen that the circuit illustrated in FIG. 2 causes the state of the contact signal to be sampled once every millisecond in successive sampling periods of 64 milliseconds. At the end of each sampling period, a card detection signal is output if the contact signal was sampled as high on at least 48 of the samples. The counter 15 is then reset and a new set of samples are taken in the next sampling period. This process may be thought of as dividing time into successive 64 millisecond sampling periods and determining the average contact signal during each period (where a low contact signal is considered to have a value of zero and a high contact signal is considered to have a value of one). If the average value for a sampling period exceeds a threshold then the state of the contact signal throughout this period is deemed to be a stable high state for the purpose of card detection.

It is understood that the parameters such as the length of the sampling period, the time interval between samples and the threshold are not limited to those values mentioned above. For example, in another embodiment, samples may be taken every two milliseconds over a sampling period of 80 milliseconds, and the threshold is 60. The values of these parameters may be chosen depending on factors including the desired speed at which cards are detected and the stability of card signals that is required.

Figure 3:
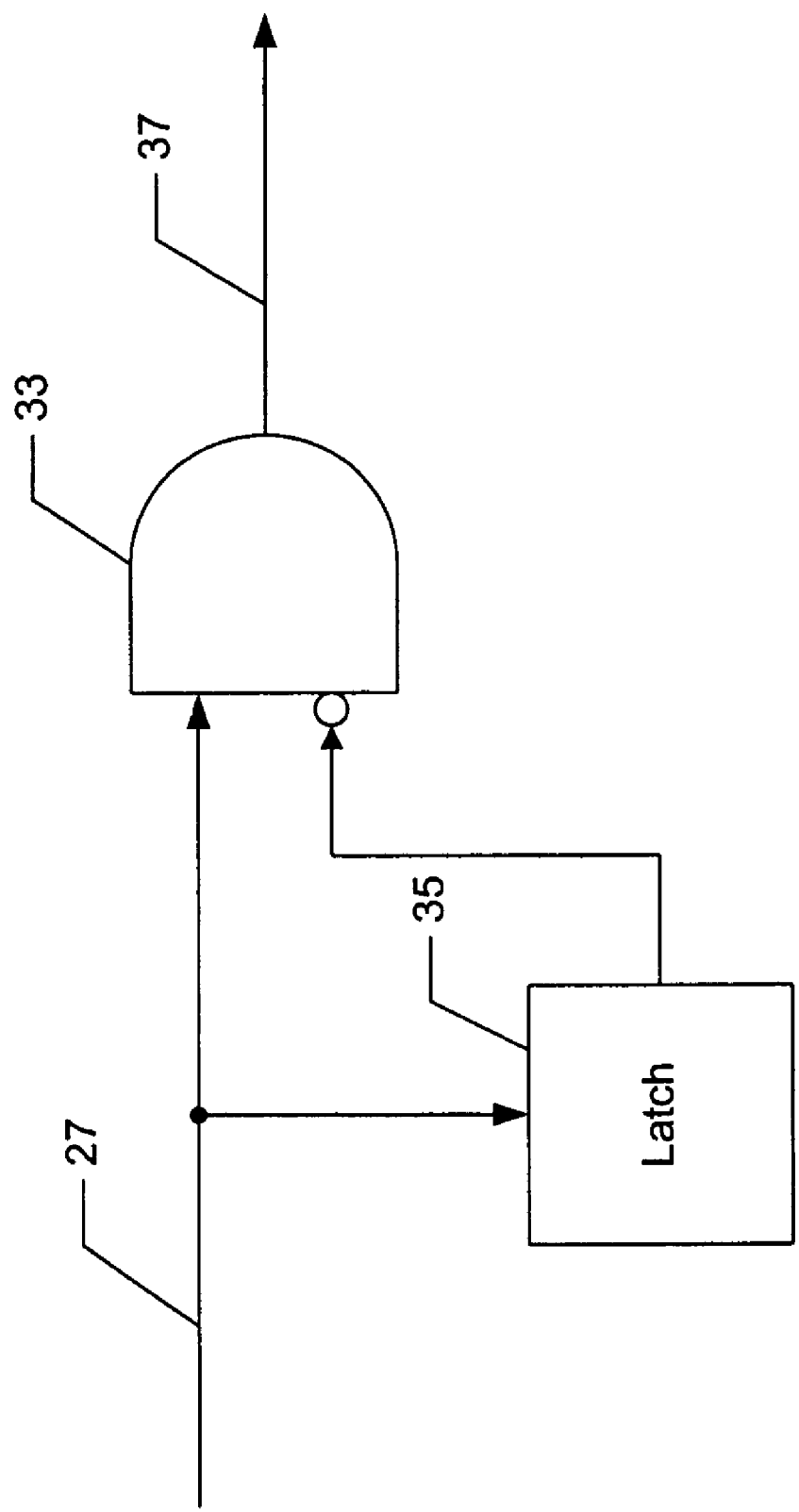
FIG. 3 is a schematic diagram of a second part of the card detection system shown in FIG. 2.

In the preferred embodiment, detection of a card causes a system reset to be performed. However, a system reset is only performed upon insertion of a card, and not when a card is removed. FIG. 3 shows a schematic representation of a circuit which provides a means for determining whether a card is being inserted into or removed from the card interface. The card detection signals transmitted on pathway 27 shown in FIG. 2 form a first input of an AND gate 33. The card detection signals also form the input of a latch 35. Upon receiving an input, the latch 35 is arranged to store the input value and to output a previously stored value. Latch 35 initially stores a low value. The output of the latch 35 is negated and input into the second input of the AND gate 33.

In the case that a card is being inserted into the card interface, the card detection signal transmitted on pathway 28 will change from a low value (since no card was previously inserted) to a high value (indicating that a card has been detected). At the moment that the card is detected, a high signal will be transmitted along pathway 28, and the first input of the AND gate 33 will be high. The high contact signal will also be input into the latch 35, causing a previously stored low contact signal to be output. When negated, this low signal becomes high, and the second input of the AND gate 33 is high. In this case, the output 37 of AND gate will be high, indicating that a card has been inserted.

In the case that a card is being removed from the card interface, the card detection signal transmitted on pathway 27 will change from a high value to a low value. At the moment the card is removed, a low signal will be present on pathway 27 and the first input of the AND gate 33 will be low. The low contact signal will also be input into the latch 35, causing the previously stored high contact signal to be output. When negated, this high signal becomes low, and the second input of the AND gate 33 is low. In this case, the output of AND gate will be low. Therefore the process of removing a card does not result in a signal being output from AND gate 33.

In some embodiments, multiple card interfaces may be provided to enable multiple cards to be used with a single system. In these embodiments, a circuit illustrated in FIG. 2 may be provided for each card interface, so that detection of cards may be performed independently. In order to save manufacturing costs and space on the semiconductor circuit, some components may be shared between the interfaces. For example, only a single clock 5 and counter 29 may be provided, with each interface sharing these components. However, other components such as the counter 15 may be provided for each separate interface.

Figure 4:
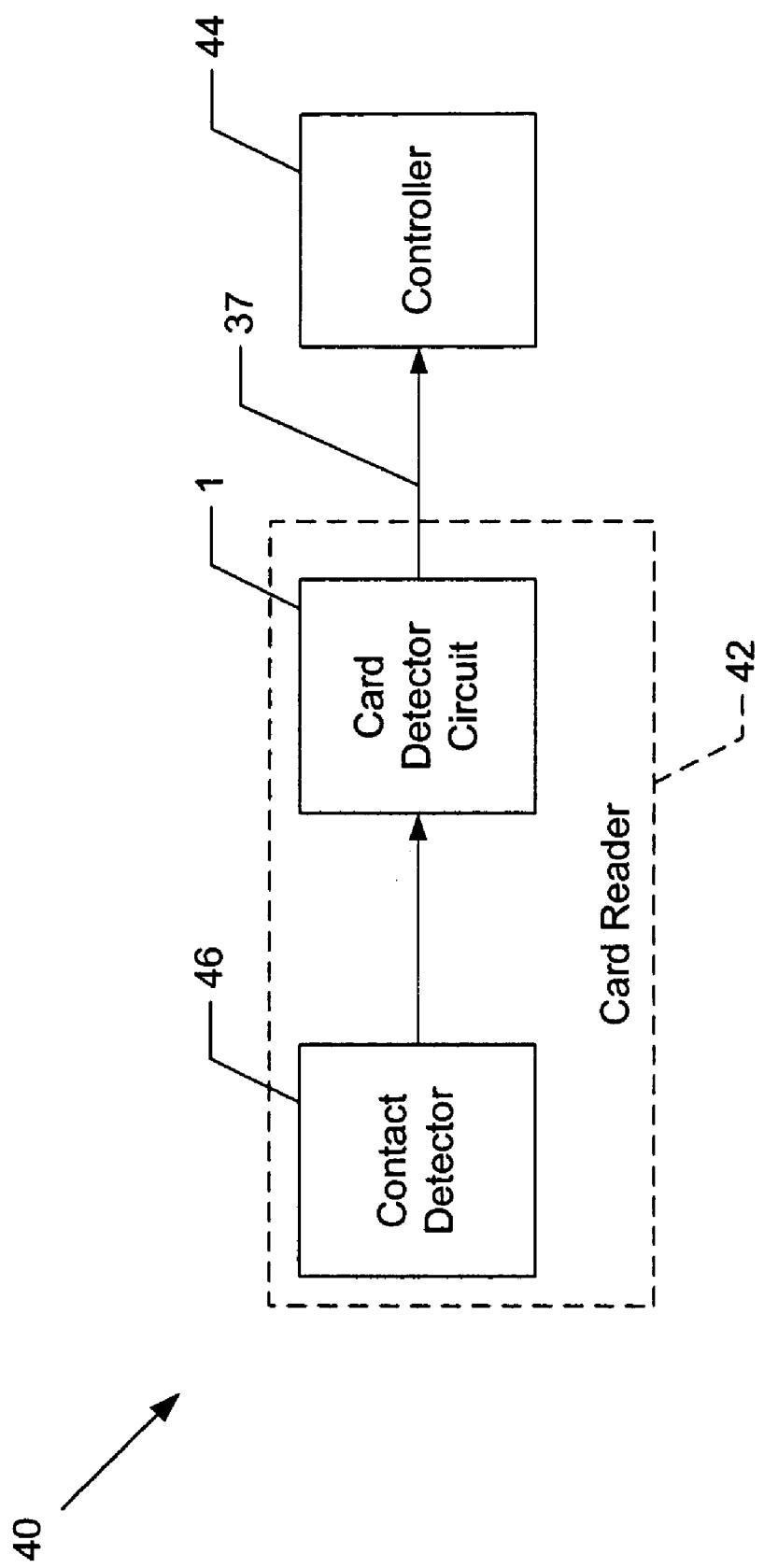
FIG. 4 is a block diagram of a set-top box 40 that uses the card detection system shown in FIGS. 2-3.

FIG. 4 is a block diagram of a set-top box 40 that uses the card detector circuit 1 shown in FIGS. 2-3. The set-top box 40 also includes a card reader 42 and a microcontroller 44 connected to the contact detector circuit 1 and structured to allow operation of the set-top box 40 in response to receiving the output signal 37 from the contact detector circuit 1. The card reader 42 includes the card detector circuit 1 and a card detector 46 that produces the contact signal on the pathway 11.

All of the above U.S. patents, U.S. patent application Publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A semiconductor integrated circuit to detect when stable electrical contact has been established between a card and a card reader, the semiconductor integrated circuit comprising:
    a signal sampler to periodically sample a state of a signal over a sampling time period, the signal being indicative of electrical contact between the card and the card reader, the signal sampler being arranged to assert a state signal each time the state of the sampled signal has a first level;
    a counter arranged to receive the state signal from the signal sampler and to increment each time the state signal is asserted; and
    a detection unit arranged to receive a value of the counter and to assert a card detection signal if the counter value exceeds a threshold.

2. The semiconductor integrated circuit of claim 1 in which the sampled signal provides a high signal having said first level when electrical contact is established between the card and the card reader, and provides a low signal when electrical contact is not established between the card and the card reader.

3. The semiconductor integrated circuit of claim 2 in which the high signal is a non-zero voltage and the low signal is a substantially zero voltage.

4. The semiconductor integrated circuit of claim 1 in which the signal sampler is arranged to assert the state signal when the first level of the sampled signal is in a high state.

5. The semiconductor integrated circuit of claim 1 in which the state signal includes one bit pulses.

6. The semiconductor integrated circuit of claim 1 in which the signal sampler includes an AND gate having two inputs and an output, the first input arranged to receive a periodic clock signal and the second input arranged to receive the sampled signal, wherein the output provides the state signal.

7. The semiconductor integrated circuit of claim 1 in which the detection unit includes:
    a comparator arranged to receive the value of the counter and to generate a comparison signal if the counter value exceeds said threshold; and
    a latch arranged to receive the comparison signal and to assert the card detection signal if the comparison signal was received within the sampling time period.

8. The semiconductor integrated circuit of claim 7, further comprising a cyclic counter arranged to transmit a reset signal to the counter and a latch signal to the latch at an end of the sampling time period.

9. The semiconductor integrated circuit of claim 7 in which the latch is arranged to receive a latch signal at substantially the end of the sampling time period, and further arranged to output a-said card detection signal upon receipt of said latch signal if the comparison signal was received within the sampling time period.

10. The semiconductor integrated circuit of claim 9 in which the counter is arranged to receive a reset signal at substantially the end of the sampling time period, and further arranged to reset upon receipt of the reset signal, wherein the latch signal is received by the latch prior to when the reset signal is received by the counter.

11. The semiconductor circuit of claim 1 in which the state of the sampled signal is sampled every millisecond.

12. The semiconductor circuit of claim 1 in which the sampling time period is 64 milliseconds.

13. The semiconductor circuit of claim 1 in which the threshold is 47.

14. The semiconductor integrated circuit of claim 1 in which the counter is arranged to receive a reset signal at substantially an end of the sampling time period, and further arranged to reset upon receipt of the reset signal.

15. The semiconductor integrated circuit of claim 1, further comprising:
    a latch arranged to receive and store a state value of the card detection signal, and further arranged to output a previously stored card detection signal state value upon receipt of the card detection signal; and an AND gate having first and second inputs and an output, the first input arranged to receive the card detection signal and the second input arranged to receive a negated output of the latch.

16. The semiconductor integrated circuit of claim 1 in which the circuit forms part of a monolithic device.

17. A card reader, comprising:
a card detector to produce a contact signal indicative of electrical contact between a card and the card reader;
a signal sampler to periodically sample a state of the contact signal over a sampling time period, the signal sampler being arranged to assert a state signal each time the state of the contact signal has a first level;
a counter arranged to receive the state signal from the signal sampler and to increment each time the state signal is asserted; and
a detection unit arranged to receive a value of the counter and to assert a card detection signal if the counter value exceeds a threshold.

18. The card reader of claim 17 in which the signal sampler includes an AND gate having two inputs and an output, the first input arranged to receive a periodic clock signal and the second input arranged to receive the contact signal, wherein the output provides the state signal.

19. The card reader of claim 17 in which the detection unit includes:
a comparator arranged to receive the value of the counter and to generate a comparison signal if the counter value exceeds said threshold; and
a latch arranged to receive the comparison signal and to assert the card detection signal if the comparison signal was received within the sampling time period.

20. The card reader of claim 19 in which the latch is arranged to receive a latch signal at substantially an end of the sampling time period, and further arranged to output a card detection signal upon receipt of a latch signal if the comparison signal was received within the sampling time period.

21. The card reader of claim 20 in which the counter is arranged to receive a reset signal at substantially the end of the sampling time period, and further arranged to reset upon receipt of the reset signal, wherein the latch signal is received by the latch prior to when the reset signal is received by the counter.

22. A set-top-box, comprising:.
a signal sampler to periodically sample a state of a contact signal over a sampling time period, the contact signal being indicative of electrical contact between a card and a card reader, the signal sampler being arranged to assert a state signal each time the state of the sampled signal has a first level;
a counter arranged to receive the state signal from the signal sampler and to increment each time the state signal is asserted;
a detection unit arranged to receive a value of the counter and to assert a card detection signal if the counter value exceeds a threshold; and
a controller to activate operation of the set-top-box in response to the asserted card detection signal.

23. The set-top-box of claim 22 in which the signal sampler includes an AND gate having two inputs and an output, the first input arranged to receive a periodic clock signal and the second input arranged to receive the contact signal, wherein the output provides the state signal.

24. The set-top-box of claim 22 in which the detection unit includes:
a comparator arranged to receive the value of the counter and to generate a comparison signal if the counter value exceeds said threshold; and
a latch arranged to receive the comparison signal and to assert the card detection signal if the comparison signal was received within the sampling time period.

25. The set-top-box of claim 24 in which the latch is arranged to receive a latch signal at substantially an end of the sampling time period, and further arranged to output a card detection signal upon receipt of a latch signal if the comparison signal was received within the sampling time period.

26. The set-top-box of claim 25 in which the counter is arranged to receive a reset signal at substantially the end of the sampling time period, and further arranged to reset upon receipt of the reset signal, wherein the latch signal is received by the latch prior to when the reset signal is received by the counter.

27. The set-top-box of claim 22 wherein said controller is arranged to perform a system reset upon detection of the card detection signal.

28. A method to detect when stable electrical contact has been established between a card and a card reader, the method comprising:
periodically sampling a state of a contact signal over a sampling time period to obtain samples, the contact signal being indicative of electrical contact between the card and the card reader;
counting a number of said samples for which the contact signal has a first state; and
asserting a card detection signal if the counted number of samples for which the contact signal has said first state exceeds a threshold.

29. The method of claim 28 in which said counting samples includes counting the number of samples for which electrical contact between the card and the card reader is present.

30. The method of claim 28 in which the state of the signal is sampled every millisecond.

31. The method of claim 28 in which the sampling time period is 64 milliseconds.

32. The method of claim 28 in which the threshold is 47.

33. The method of claim 28, further comprising performing a system reset when the card detection signal is asserted.

34. The method of claim 28, further comprising:
detecting whether the card is being inserted or removed from the card reader; and
performing a system reset if the card is inserted into the card reader.

35. The method of claim 34, further comprising:
monitoring the card detection signal; and
performing a system reset only if the card detection signal changes from a first particular state to a second particular state.

36. The method of claim 35 in which the first particular state is a digital low state and the second particular state is a digital high state.

37. The method of claim 28 wherein said counting is performed by a counter, the method further comprising resetting said counter only at an end of said sampling time period.

* * * * *

UNITED STATES PATENT AND TRADEMARK OFFICE
CERTIFICATE OF CORRECTION

PATENT NO. : 7,506,810 B2
APPLICATION NO. : 11/152673
DATED : March 24, 2009
INVENTOR(S) : Jeremy Whaley et al.

It is certified that error appears in the above-identified patent and that said Letters Patent is hereby corrected as shown below:

Column 6
Line 42, "output a-said card detection signal upon receipt of said latch" should read as -- output said card detection signal upon receipt of said latch --

Signed and Sealed this

Eighteenth Day of August, 2009

David J. Kappos
*Director of the United States Patent and Trademark Office*